W. S. WOODS.
CUSHION TIRE.
APPLICATION FILED JAN. 30, 1915.
1,205,833.
Patented Nov. 21, 1916.
2 SHEETS—SHEET 1.
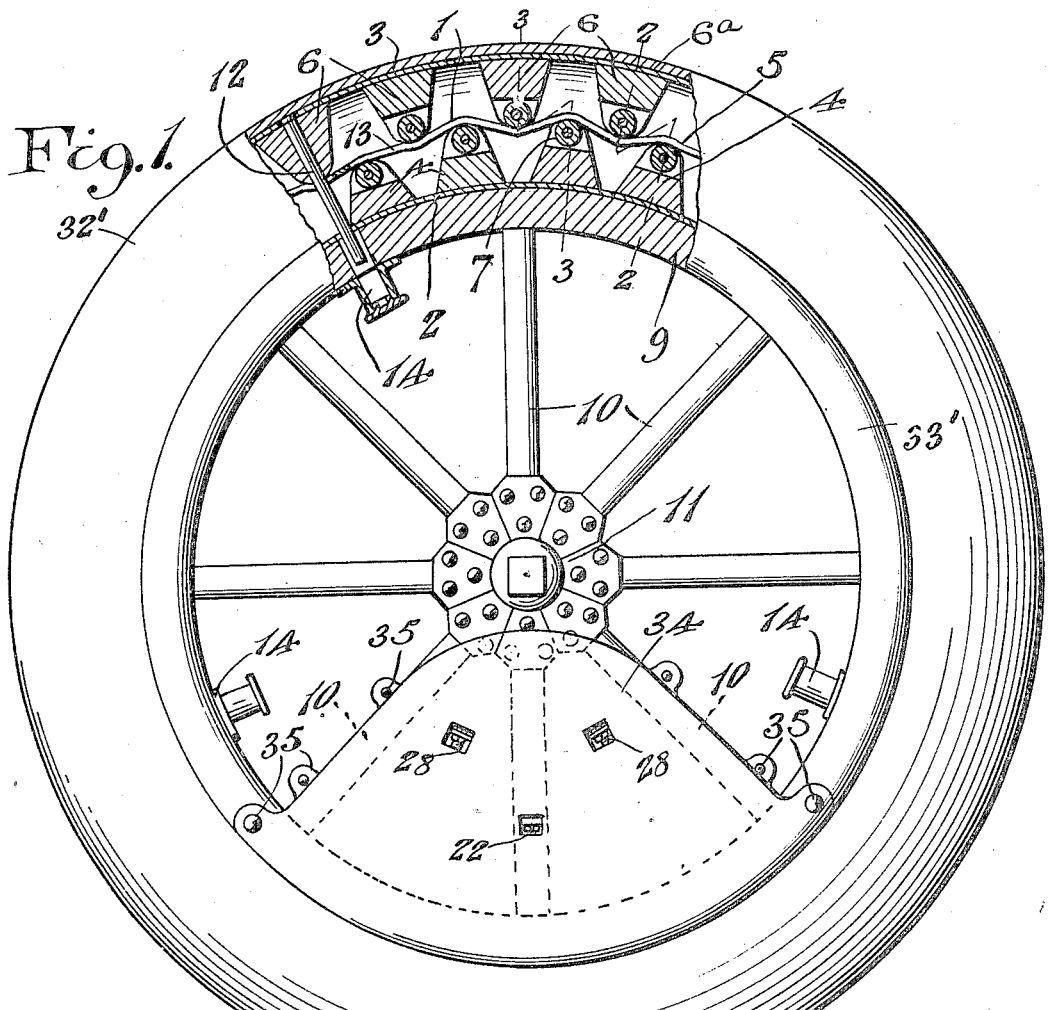
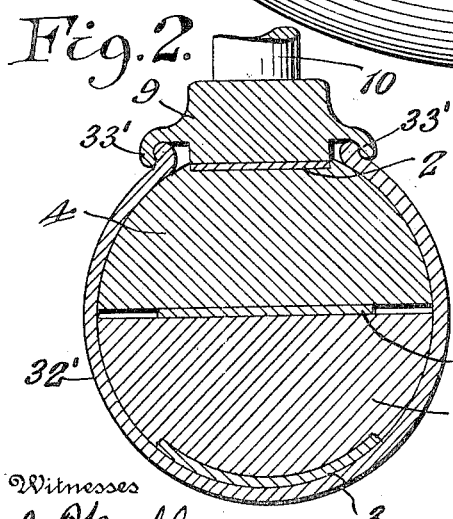
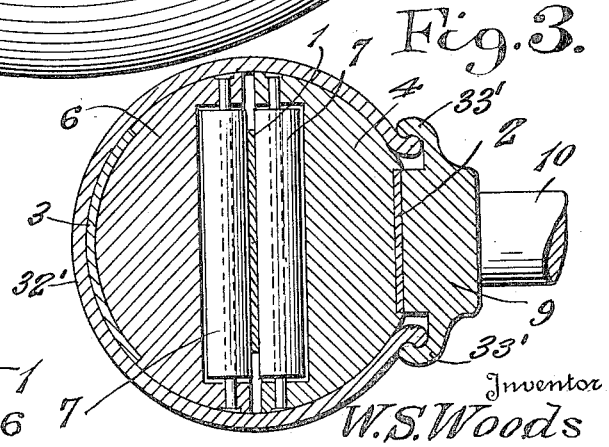

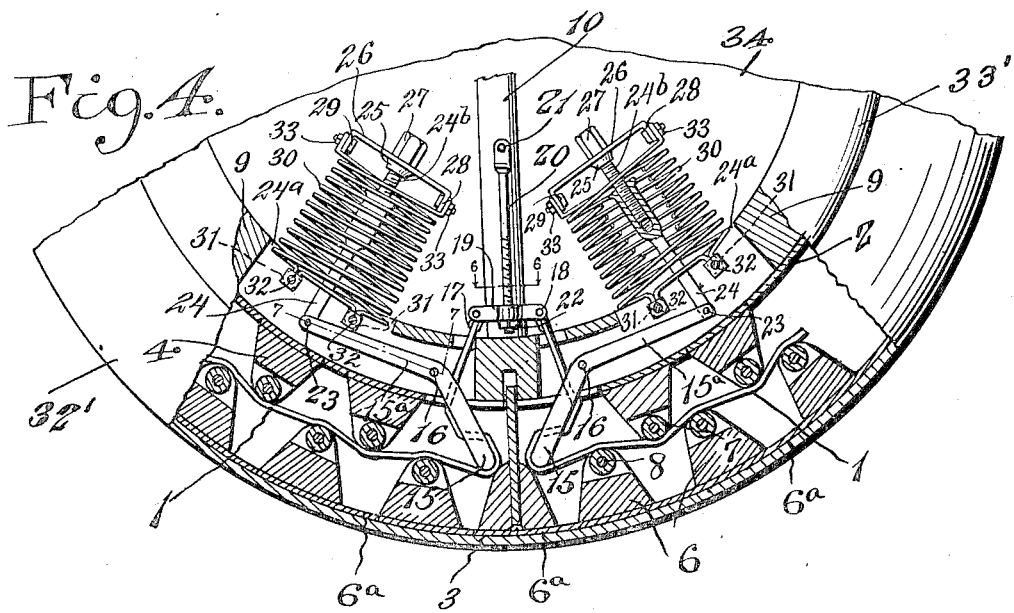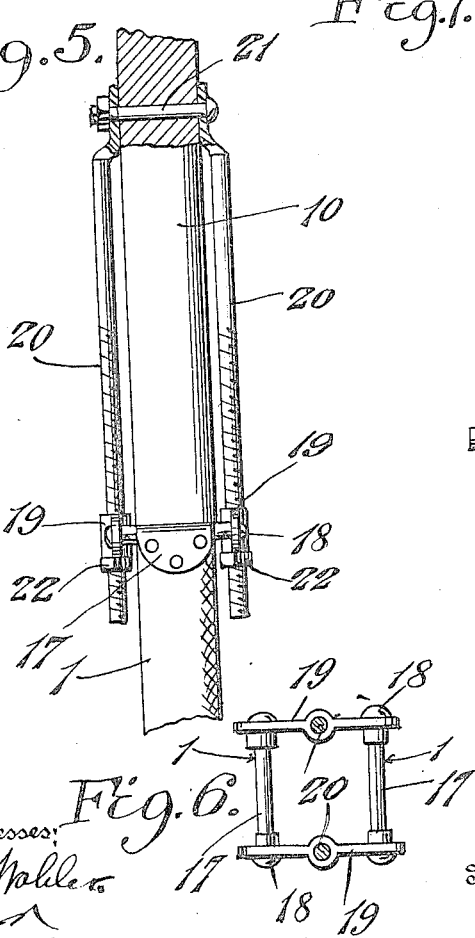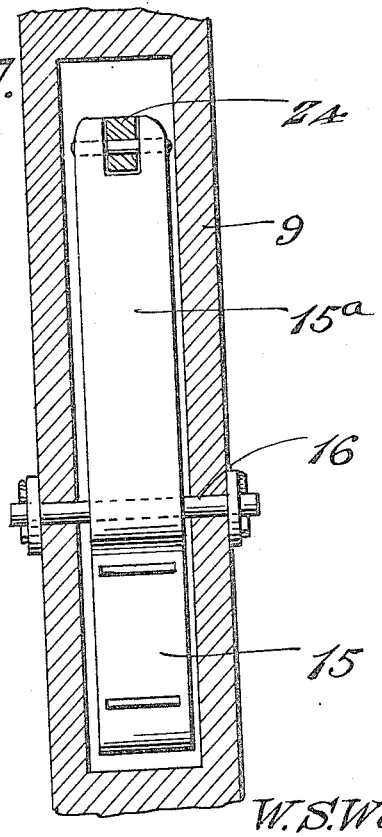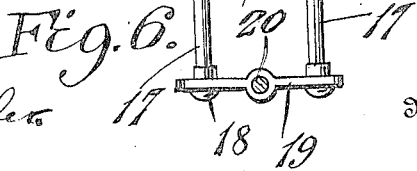

UNITED STATES PATENT OFFICE.

WILLIAM S. WOODS, OF NEWCASTLE, INDIANA.

CUSHION-TIRE.

1,205,833.

Specification of Letters Patent.   Patented Nov. 21, 1916.

Application filed January 30, 1915.   Serial No. 5,270.

*To all whom it may concern:*

Be it known that I, WILLIAM S. WOODS, a citizen of the United States, residing at Newcastle, in the county of Henry and State of Indiana, have invented certain new and useful Improvements in Cushion-Tires; and I do hereby declare the following to be a full, clear, and exact description of the invention, such as will enable others skilled in the art to which it appertains to make and use the same.

This invention relates to cushion tires, the principal object being to provide a tire to take the place of the ordinary pneumatic tire, and to eliminate the defects of pneumatic tires by providing a non-puncturable tire, and one which will not collapse or blow-out, and at the same time will provide means for absorbing shocks or jars of an automobile or other vehicle.

The foregoing and other objects may be attained by means of the construction illustrated in the accompanying drawings, in which—

Figure 1 is a side elevation and partial section of a cushion tire and wheel made in accordance with this invention, Fig. 2 is a sectional view taken on the line 2—2 of Fig. 1, Fig. 3 is a sectional view taken on the line 3—3 of Fig. 1, Fig. 4 is a detail sectional view of the central belt adjusting means and the spring actuated levers operating on the central belt or member, Fig. 5 is a view in side elevation of one of the spokes and the adjusting means for the central belt or member, Fig. 6 is a sectional view taken on the line 6—6 of Fig. 4, looking in the direction indicated by the arrow, and Fig. 7 is a detail sectional view taken on the line 7—7 of Fig. 4, looking in the direction indicated by the arrow.

Referring to the drawings, the numeral 1 designates the central flexible belt, 2 designates the inner belt, and 3 the curved outer belt. Secured to the inner belt 2 is a series of blocks 4 slightly spaced apart and said blocks comprising a base portion connected to the belt 2 in any suitable manner, and tapering toward the inner terminal 5. These blocks extend entirely around the belt 2, and connected to the belt 3 are similar blocks 6, said blocks 6 being interposed between the blocks 4, so that the arrangement is such that the blocks 4 will occupy the space between the blocks 6. The belt 1 extends around between the blocks 4 and 6, and mounted at the curved ends of the blocks are rollers 7, said rollers being journaled in the blocks and having their outer surfaces extending but slightly beyond the terminal ends of the blocks.

The inner belt 2 is secured to the felly 9 and the spokes 10 may be secured to the felly in any suitable way and the hub 11 may be of any suitable form.

Bolts 12 are secured to the outer curved belt 3 and passed through one of the blocks 6 and passed through the central belt 1 which is provided with elongated slots to allow it to move relatively to the blocks. The free ends of the bolts 12 pass through openings in the inner belt 2 and the felly 9, to be received in cap nuts 14 to allow the bolts to move inwardly and outwardly from the felly 9.

The central belt 1 has its ends passed into and out through levers 15, said levers being pivoted at 16 to the felly. The ends of the belt 1 are connected by means of metal clips 17 to bolts 18 which extend across between two adjusting plates 19. Connected to opposite sides of one of the spokes 10 are threaded bolts 20, said bolts being connected by a single screw or bolt 21 to the spoke 10, the outer ends of the bolts 20 extending through the adjusting plates 19 and provided with an adjusting nut 22. By adjusting the nuts 22, the belt 1 may be shortened or lengthened as desired to give the required tension to the tire. The central belt 1 extends through one arm of each of the levers 15, and the pivotal point 16 of said levers is located at the junction of the two arms of said levers.

The arms 15ª are each pivotally connected at 23 to rods 24 which extend out of the felly 9 through openings 24ª and have their free ends enlarged to form internally screw-threaded sockets. Rods 24ᵇ are screwed into the sockets and are provided with shoulders 25 to support plates 26 which are centrally apertured to receive the upper ends of the rods 24ᵇ. The upper ends of the rods 24ᵇ are shouldered as illustrated at 27 to receive a wrench for adjusting the rods 24ᵇ upwardly and downwardly within the sockets. The plates 26 are provided with downwardly depending flanges 28 which are apertured to receive bolts 29. Springs 30 surround the bolts 24 and are each constructed from a continuous piece of resilient metal, bent intermediate their ends to form loops 31 which receive bolts 32 carried by the felly 9. The ends are then coiled and the free ends are looped to receive the bolts 29 and secured thereon by nuts 33. Thus it will be seen by the arms 15ª moving upwardly, the plates 26 will be forced upwardly against the tension of the springs 30. The levers 15 are caused to move by the blocks 4 moving between the blocks 6, causing the central belt 1 to move and pull downwardly upon the free ends of the levers 15. Therefore it can be seen that the springs 30 absorb all shocks and jars caused by the wheel passing over uneven ground.

The outer cover or tread portion of the tire 32' is secured at its opposite edges to the rim flanges 33' on the opposite sides of the felly in any suitable manner.

The springs 30 and the levers 15 and connected parts are covered by means of plates 34 secured at opposite sides to the spokes 10 by means of suitable connections 35, and these plates may be provided with openings to receive a wrench for turning the shouldered ends 27 of the rods 24ᵇ and the nut 22 for adjusting the tension of the central belt 1 at its ends.

In operation, when the wheel strikes an obstacle in the road way the blocks 4 and 6 will be moved in the direction of each other, carrying with them the belt 1, which causes a pull on the levers 15 and the rods 24 to be moved against the tension of the springs 30, whereby a cushion effect is provided to the wheel which will eliminate the employment of pneumatic tires.

From the foregoing it will be obvious that a cushion tire made in accordance with this invention will obviate the present tire troubles, cannot be punctured, cannot be blown out, will absorb the shocks and jars incident to travel on rough roads, can be adjusted in accordance with the load to be carried, and is strong, durable and efficient for its purpose.

Various changes may be made in the details of construction without departing from the spirit and scope of the invention as defined in the claims.

What is claimed is:—

1. A cushion tire comprising an inner member secured to the felly of a wheel, an outer curved member, said member carrying intermediately disposed and alternately arranged tapering blocks provided with rollers, an intermediate belt extending between said rollers, means for adjusting the ends of said central belt comprising bolts secured to one of the spokes of the wheel, adjusting plates through which said bolts extend, and nuts on said bolts for adjusting the ends of the central belt, levers pivoted to the felly, said belt extending through the free ends of said levers, bolts pivoted to the opposite ends of the levers, springs surrounding said bolts, and means for adjusting the tension of said springs.

2. A cushion tire comprising inner and outer members tapering blocks connected to said inner and outer members and being oppositely disposed and alternately arranged, an intermediate belt, bolts extending through said inner and outer members and through said central belt, means for adjusting the ends of said central belt, levers pivoted to the inner members and receiving said central belt in one of their ends, spiral springs, bolts connected to said levers and extending through said springs, means for adjusting the tension of said springs, and side plates for covering said springs, levers and adjusting devices.

3. In combination, a wheel, rollers journaled upon the fellies of the wheel, an outer belt, rollers journaled upon the outer belt, a pair of levers pivoted between their ends upon the felly and each having one of its ends provided with slots, an inner belt located between the rollers and having the ends thereof passing through the slots in the levers, an element connecting the ends of the belt, means adjustably connecting said element to the wheel, and tension springs carried by the wheel and connected to the other ends of said levers.

In testimony whereof I affix my signature in presence of two witnesses.

WILLIAM S. WOODS.

Witnesses:
DON LINES,
H. J. PRESSNALL.